United States Patent [19]

Hattori

[11] Patent Number: 4,530,256
[45] Date of Patent: Jul. 23, 1985

[54] MOTOR VEHICLE TRANSMISSION HAVING A VARIABLE PULLEY IN PARALLEL WITH AN INTERLOCKING GEAR

[75] Inventor: Torao Hattori, Wako, Japan

[73] Assignee: Honda Giken Kogyo Kabushiki Kaisha, Tokyo, Japan

[21] Appl. No.: 473,270

[22] Filed: Mar. 8, 1983

[30] Foreign Application Priority Data

Mar. 10, 1982 [JP] Japan ................... 57-37416
Mar. 10, 1982 [JP] Japan ................... 57-37417
Mar. 12, 1982 [JP] Japan ................... 57-39027

[51] Int. Cl.³ ............................................. F16H 37/00
[52] U.S. Cl. ........................... 74/689; 192/83; 192/87.14
[58] Field of Search .......... 74/689, 745, 740, 694, 74/700; 474/29, 28; 192/87.14, 87.16, 87.18, 87.19, 3.57, 87.15, 12 C, 83

[56] References Cited

U.S. PATENT DOCUMENTS

| 2,706,026 | 4/1955 | Georgeff | 192/12 C |
| 2,836,270 | 5/1958 | Leopold | 192/12 C |
| 3,292,751 | 12/1966 | McRay et al. | 192/83 X |
| 3,375,734 | 4/1968 | Lemons | 74/689 |
| 3,527,328 | 9/1970 | Maurice | 192/87.19 X |
| 3,600,960 | 8/1971 | Karig | 474/28 X |
| 4,169,523 | 10/1979 | Malinowski et al. | 192/83 X |
| 4,402,237 | 9/1983 | Tomlinson | 74/689 |
| 4,458,558 | 7/1984 | Frank | 74/689 X |

FOREIGN PATENT DOCUMENTS

| 90155 | 7/1981 | Japan | 74/689 |
| 160429 | 12/1981 | Japan | 192/87.18 |

Primary Examiner—Lawrence J. Staab
Assistant Examiner—Dwight G. Diehl
Attorney, Agent, or Firm—Armstrong, Nikaido Marmelstein & Kubovcik

[57] ABSTRACT

A transmission for a motor vehicle comprises an input shaft connected to the crank shaft of an engine, an output shaft connected to a driving wheel, a V-belt stepless variable speed gear provided between the input and output shafts for providing different gear ratios of the input and output shafts on a stepless basis, and an interlocking transmission gear provided between the input and output shafts parallel to the stepless variable speed gear which, when operated, provides a constant gear ratio of the input and output shafts. A hydraulically operated first clutch of a normally-closed type is provided on the input shaft for operating the stepless variable speed gear when it is connected, and a hydraulically operated second clutch of a normally open type is provided on the output shaft for operating the interlocking transmission gear when it is connected. The hydraulic cylinders of the first and second clutches are allowed to alternately communicate with a hydraulic pump and an oil tank through a control valve.

6 Claims, 7 Drawing Figures

MOTOR VEHICLE TRANSMISSION HAVING A VARIABLE PULLEY IN PARALLEL WITH AN INTERLOCKING GEAR

BACKGROUND OF THE INVENTION

1. FIELD OF THE INVENTION

This invention relates to a transmission for use as the transmission system of a motorcycle, an automobile and the like, and more particularly to a transmission in which a V-belt type of stepless variable speed gear is provided between an input shaft linked to the output shaft of an engine and an output shaft linked to the driving wheel or wheels, so that the gear ratio between the input and output shafts can be controlled on a stepless basis.

2. DESCRIPTION OF THE PRIOR ART

The advantage of this V-belt type of stepless variable speed gear is an excellent drivability which is readily made available for a motor vehicle under various driving conditions, including starting, accelerating, deceleration, climbing, cruising and so on, by changing each of the effective radii of a driving V-pulley linked to the input shaft and a driven V-pulley linked to the output shaft, or the radii of them in contact with a V-belt. However, because of a certain degree of slip between the V-belt and the V-pulleys, its disadvantage is that transmission efficiency is inferior to that of an interlocking transmission gear employing gears and chains; this is also disadvantageous in view of fuel-saving.

In the meantime, since the length of time in which a motor vehicle is cruising is normally longer than that in which it is in other driving conditions, it is vertually unnecessary to change the gear ratio when cruising; in other words, the stepless speed-changing function of the V-belt stelpless variable speed gear is not required. Accordingly, it is preferred to adopt the interlocking transmission gear with its high transmission efficiency instead of the stepless variable speed gear.

BRIEF SUMMARY OF THE INVENTION

An object of the present invention is to provide a transmission of the above type for a motor vehicle, wherein a V-belt stepless variable speed gear and an interlocking transmission gear are installed in parallel between input and output shafts to allow the gears to be selectively operated, so that a transmission offering an excellent drivability as well as a high transmission efficiency is made available by securing the advantages of the V-belt stepless variable speed gear while making up for the disadvantages of the interlocking transmission gear.

Another object of the present invention is to provide a transmission of the above type wherein the life of the V-belt stepless variable speed gear may be extended.

A third object of the present invention is to provide a transmission of the above type wherein the shock to which the transmission system would be subjected is effectively absorbed when the operation of the interlocking transmission gear is switched over to that of the V-belt stepless variable speed gear.

A fourth object of the present invention is to provide a transmission of the above type wherein clutches are employed to selectively operate the V-belt stepless variable speed gear and the interlocking transmission gear in order to change the operation of the former to that of the latter simply, and vice versa, and the clutch may be used commonly as the starting clutch to make the transmission simple and compact in construction.

Other objects, features and advantages of the present invention will be self-evident if reference is made to the drawings attached hereto and the description of embodiments of the present invention.

BRIEF DESCRIPTION OF THE DRAWING

The drawings refer to transmission systems according to the present invention installed in motorcycles.

FIG. 2A is an operational diagram of the principal parts of FIG. 2.

FIG. 3A is an operational diagram of the principal parts of FIG. 3.

PREFERRED EMBODIMENTS OF THE INVENTION

Figure 1:
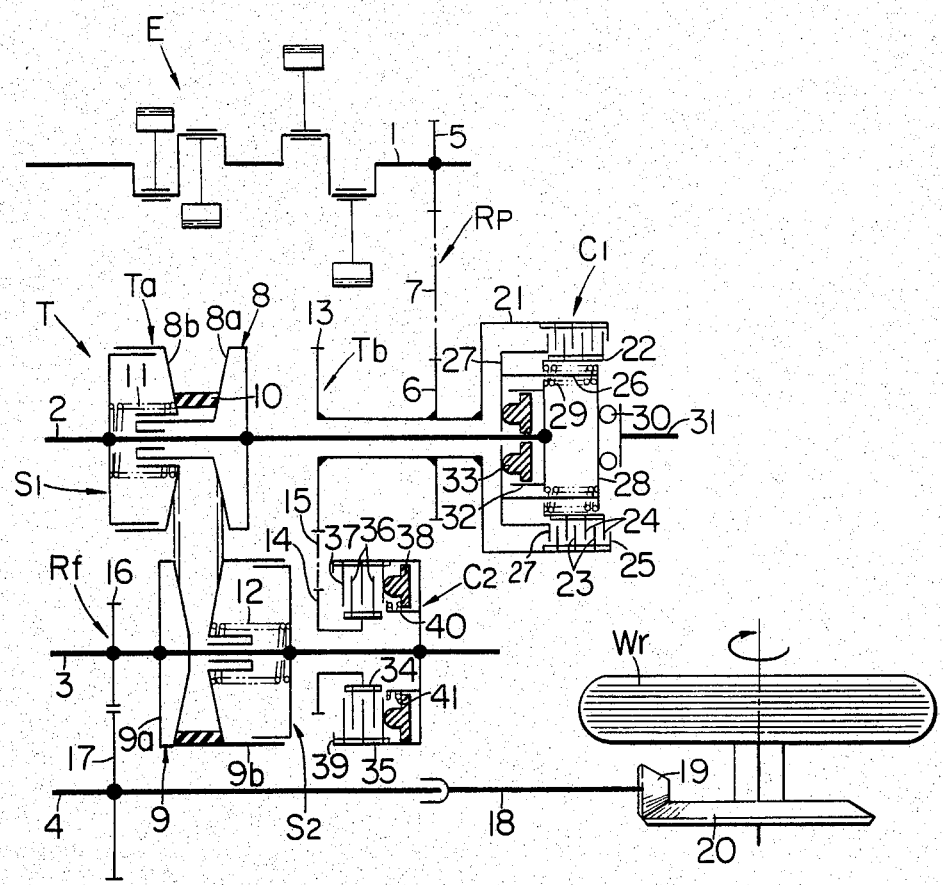
FIG. 1 is an exploded plan view of a first embodiment.

Referring now to the drawings, embodiments of the present invention will be described.

FIG. 1 is a first embodiment of the present invention applied to the transmission system of a motor cycle. In FIG. 1, input and output shafts 2, 3, and a final drive shaft 4 of a transmission T according to the present invention are arranged parallel to the crank shaft 1 of an engine E, and a first reduction gear Rp consisting of a driving sprocket wheel 5, a driven sprocket wheel 6 and a chain 7 wound around them is provided between the crank shaft 1 and the input shaft 2, the driven sprocket wheel being rotatably supported by the input shaft 2. A V-belt stepless variable speed gear Ta and an interlocking transmission gear Tb are placed parallel to each other between the input and output shafts 2, 3; by selectively operating either device, rotational torque is transmitted from the input shaft 2 to the output shaft 3.

The V-belt stepless variable speed gear Ta is mainly composed of a driving V-pulley 8 attached to the input shaft 2 in such a manner that the pulley 8 rotates together with the input shaft 2, a driven V-pulley attached to the output shaft 3 in such a manner that the pulley rotates together with the output shaft 3, and a V-belt 10 wound around these pulleys 8, 9. The driving pulley 8 comprises a fixed half-pulley 8a fixed to the input shaft 2 and a half-pulley 8b movable forward and backward with respect to the fixed half-pulley 8a so that the effective radius of the driving V-pulley 8 can be adjusted, and a spring 11 energizing the movable half-pulley 8b at all times in the forward direction, and a known first hydraulic servomotor S1 for moving the movable half-pulley 8b, are provided on the back of the movable half-pulley 8b. In addition, the driven V-pulley 9 is composed of a fixed half-pulley 9a located on the same side as that of the movable pulley 8b of the driving pulley 8, and a movable half-pulley 9b located on the same side as that of the fixed half-pulley 8a of the driving V-pulley 8 and which can move forward and backward with respect to the fixed half-pulley 9a so that the effective radius of the driven V-pulley 9 can be adjusted. The back of the movable half-pulley 9b is provided with a spring 12 energizing the half-pulley 9b at all times in the forward direction, and a known second hydraulic servomotor S2 for moving the movable half-pulley 9b. Consequently, this stepless speed change device Ta is capable of changing the gear ratio of the two pulleys 8, 9 from a preset maximum (for instance, 4.0) to a minimum (for instance, 1.0) on a stepless basis by means of the servomotors S1, S2.

The interlocking transmission gear Tb comprises a driving sprocket wheel 13 linked to the driven sprocket wheel 6 adjacent to the fixed half-pulley 8a of the driving V-pulley 8, a driven sprocket 14 rotatably attached to the output shaft 3 adjacent to the movable half-pulley 9a of the driven pulley 9, and a chain 15 wound around both the sprocket wheels 13, 14. These sprocket wheels 13, 14 are so constructed that their gear ratio can not exceed 1.0, that is, the driving sprocket wheel 13 is allowed to drive and accelerate (overdrive) the driven sprocket 14. Furthermore, the interlocking transmission gear may be composed of a driving gear wheel and a driven gear wheel engaging with each other through an idle gear.

To selectively operate the V-belt stepless variable speed gear Ta and the interlocking transmission gear Tb, a first clutch C1 and a second clutch C2 are provided between the driven sprocket wheel 6 and the input shaft 2, and between the output shaft 3 and the driven sprocket wheel 14, respectively.

The first clutch C1 is provided with a clutch outer 21 linked and incorporated with the driven sprocket wheel 6 of the first reduction gear Rp and a clutch inner 22 arranged inside the clutch outer 21 and linked to the input shaft 2 and a plurality of driving clutch plates 23 connected to the outer 21 by splines, and a plurality of driven clutch plates 24 connected to the inner 22 by splines, are arranged in an alternately overlapping way between the clutch outer and inner 21, 22. On opposite sides of the groups of clutch plates 23, 24 are provided a pressure receiving ring 25 and a pressure plate 27 connected to the clutch inner 22 by a plurality of bolts 26 in such a manner that the plate can slide over the clutch, and a clutch spring 29 is compressed between a support 28 connecting the plurality of bolts 26 and the clutch inner 22. As a result, the clutch spring 29 presses the pressure plate 27 against the pressure receiving ring 25 via the support 28 and the bolts 26, so that the pressure makes the driving and driven clutch plates 23, 24 join together frictionally, that is, the clutch halves come in contact with each other. Accordingly, the first clutch C1 is a usually-closed type.

The support 28 is connected to a clutch lifter 31 by release bearings 30. If the clutch spring 29 is compressed by the clutch lifter 31 pushing against the support 28, the pressure plate 27 will be moved backward to allow the clutch plates 23, 24 to be released and separated.

A hydraulic cylinder 32 is connected to the clutch inner 22 and a piston 33 attached to the pressure plate 27 is made to slide into the hydraulic cylinder 32. If hydraulic pressure is applied to the hydraulic cylinder 32, the piston moves the pressure plate 27 backward, so that the clutch halves are separated even in this case.

The second clutch C2 is provided with a clutch inner 34 connected to the driven sprocket wheel 14 of the interlocking transmission gear Tb, and a clutch outer 35 connected unitarily to the output shaft 3 in such a manner as to enclose the clutch inner 34 and, between the clutch inner and outer 34, 35, a plurality of driving clutch plates 36 connected to the inner 34 by splines, and a plurality of driven clutch plates 37 connected to the outer 35 by splines, are arranged in an alternately overlapping way. A piston 38 and a pressure receiving ring 39 are arranged sandwiching the groups of clutch plates 36, 37, the piston 38 is made to slide in a hydraulic cylinder 40 formed in the clutch outer 35, and the pressure receiving ring 39 is fixed to the clutch outer 35. If hydraulic pressure is applied to the hydraulic cylinder 40, it will move the piston 38 forward, causing the two groups of clutch plates 36, 37 to be pressed against the pressure receiving ring 39, and this pressure makes the groups of clutch plates join together frictionally, that is, the clutch halves are connected.

The hydraulic cylinder 40 is equipped with a return spring 41 which always energizes the piston 38 in the backward direction and because of this all of the clutch plates 36, 37 are normally released, or separated from each other. Therefore, the second clutch C2 is a normally-open type.

The output shaft 3 is linked to the final drive shaft 4 by a final reduction gear Rf comprising a pair of gear wheels 16, 17 transmitting power, and the final drive shaft 4 is connected to a driving wheel, or a rear wheel Wr, through a propeller shaft 18 and a pair of bevel gears 19, 20 to allow power to be transmitted.

In the transmission thus constructed, to start the motorcycle, the second clutch C2 is first left unconnected and the first clutch C1 is gradually connected to the second clutch C2 while the stepless variable speed gear is in such a condition that its gear ratio is at a maximum. According to this method of connection, the rotational torque of the crank shaft 1 of the engine E is transmitted by the first reduction gear Rp to the input shaft 2 and then to the driving V-pulley 8, the V-belt 10, the driven V-pulley 9, and the output shaft 3 in order; from this output shaft 3 the torque is then transmitted to the rear wheel Wr through the final drive shaft 4, the propeller shaft 18 and the bevel gears 19, 20 in order to drive the rear wheel Wr. The gear ratio of the stepless variable speed gear Ta is then reduced as the vehicle speed increases, or else the ratio is increased in proportion to the increase of the load to drive the vehicle smoothly.

During this time, because the interlocking transmission gear Tb is separated from the output shaft 3 due to the disconnection of the second clutch C2, the transmission gear is not in operation and it will not interfere with the operation of the stepless variable speed gear Ta.

When the vehicle starts to cruise at high speed, the first clutch C1 is disconnected and the second clutch C2 is connected. Due to the disconnection of the first clutch C1, the link between the first reduction gear Rp and the driving V-pulley 8 is released and, the connection of the second clutch C2 causes the driven sprocket wheel 14 to be connected to the output shaft 3. Consequently, the output torque of the first reduction gear Rp is transmitted to the output shaft 3 by the interlocking transmission gear Tb so that the transmission gear is placed in the so-called overdrive state, that is, the transmission gear drives the output shaft 3 at a constant gear ratio. Therefore, slip losses in the V-belt type stepless variable speed gear Ta create no problems, making high speed cruising with a high transmission efficiency available.

In both of the first and second clutches C1, C2 are disconnected, the stepless variable speed gear Ta and the transmission gear Tb will stop operating and the transmission T will go into neutral.

Although the shaft drive method has been adopted in the above example as the method of driving the rear wheel Wr, the chain drive method may be employed.

Figure 2:
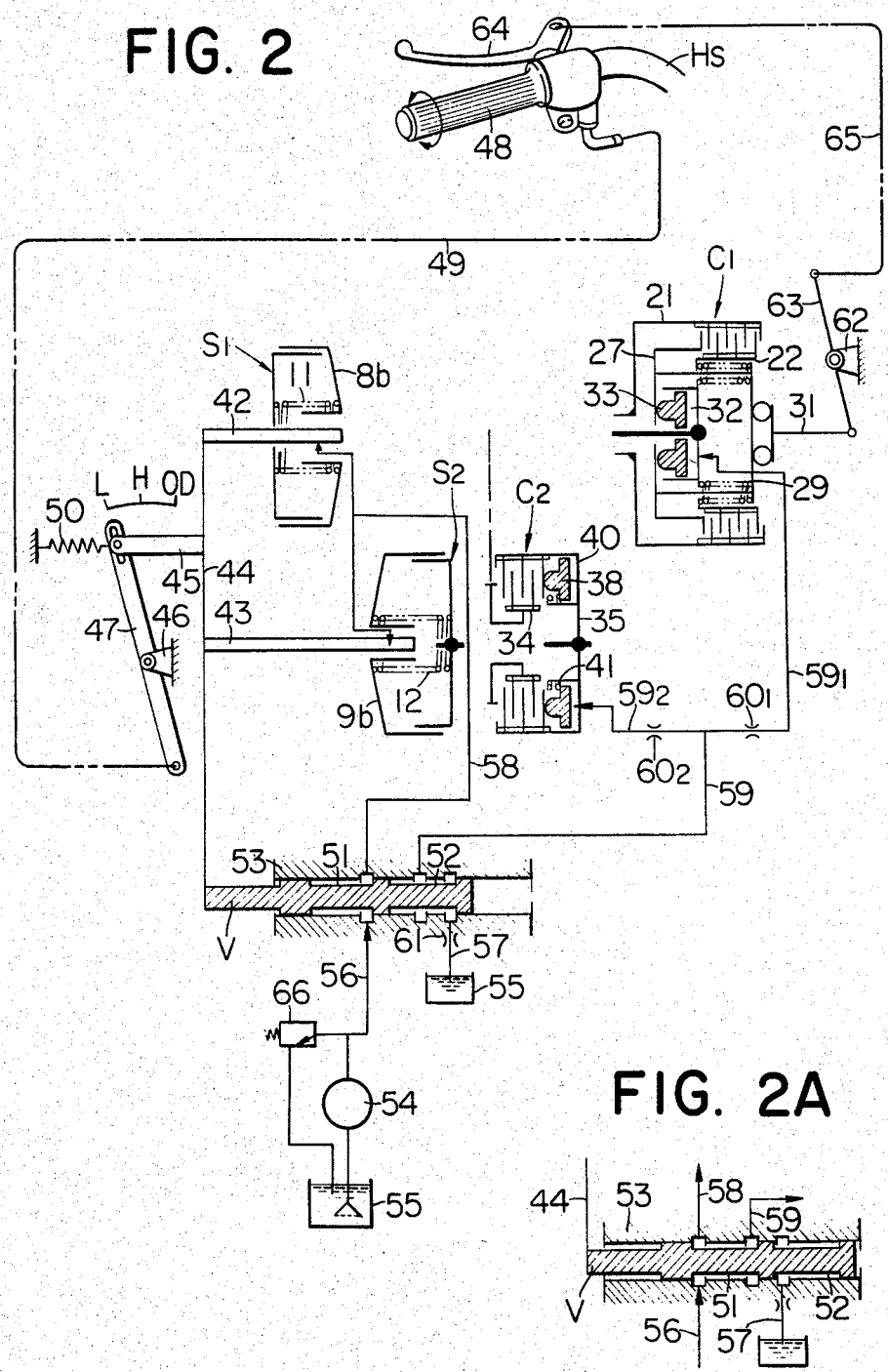
FIG. 2 is a diagram of the hydraulic control circuit.

Referring to FIG. 2, the control system of the transmission T according to the present invention will be described below.

First and second servomotors S1, S2 of the V-belt type stepless variable speed gear Ta are provided with pilot valves 42, 43 in the same way as in a prior art transmission. Both of the pilot valves 42, 43 are connected to a gear lever 45 by an interlocking rod 44 so that they can be operated simultaneously. If the gear lever 45 is moved to the right in the drawing by shifting the lever from the position L to H, each of the hydraulic servomotors S1, S2 are operated through operations of each of the pilot valves 42, 43 to bias the movable half-pulley 8b of the driving V-pulley 8 toward the fixed half-pulley 8a due to the resilient force of the spring 11, thereby to increase the effective radius of the driving V-pulley 8 and to displace the movable half-pulley 9b apart from the fixed half-pulley 9a of the driven V-pulley 9 against the force of the driven V-pulley 9 in known manner. Thus, the gear ratio of the stepless variable speed gear Ta is varied in a stepless manner.

One end of a shift lever 47 pivoting about a fixed bracket 46 is connected to the gear lever 45, whereas the other end is connected to a gear-shift grip 48 attached to one of the handle bars Hs of a motorcycle via an operating wire 49 and, if the operating wire 49 is pulled, the shift lever 47 will be able to shift the gear lever 45 from position L to H and then to OD. A return spring 50 energizing the gear lever 45 toward position L is attached to the lever.

A spool type of control valve V is connected to the interlocking rod 44 parallel to the pilot valves 42, 43. The control valve V is provided with first and second annular grooves 51, 52 around its periphery. A high pressure hydraulic passage 56 extending from the outlet of a hydraulic pump 54, a first output oil passage 58 connected to the pilot valves 42, 43 of the first and second servomotors S1, S2, and a second output oil passage 59 connected to the hydraulic cylinders 32, 40 of the first and second clutches C1, C2 are connected to a valve case 53 containing the control valve V.

The second output oil passage 59 branches off midway into two oil passages $59_1$, $59_2$ so as to supply operating fluid simultaneously to two hydraulic cylinders 32, 40, and these oil passages $59_1$, $59_2$ are supplied with distribution orifices $60_1$, $60_2$, respectively. A low pressure oil passage 57 is also provided with an orifice 61.

One end of an operating lever pivoting about a fixed bracket 62 is connected to the clutch lifter 31 of the first clutch C1, and the other end is connected to a clutch lever 64 attached to the handlebar Hs by an operating wire 65. If the clutch lever 64 is pulled toward the handlebar Hs to pull the operating wire 65, the clutch lifter 31 will operate in such a way that if disconnects the first clutch C1.

In the drawing a relief valve 66 for the high pressure oil passage 56 is shown.

The operation of the control system will be described below on the basis of various driving conditions of the vehicle.

(Neutral)

By operating the gear-shift grip 48, the gear lever 45 is placed in position L or H, and at the same time the first clutch C1 is isolated by pulling the operating wire 65 by means of the clutch lever 64. When the gear lever 45 is in position L or H, the control valve V allows the high pressure oil passage to communicate with the first output oil passage 58 via the first annular groove 51; for this reason, the hydraulic cylinder 40 of the normally-open second clutch C2 is opened to an oil tank 55 and the clutch stays disconnected. Consequently, the first and second clutches C1, C2 are both disconnected, thus establishing the neutral state.

(Starting)

The gear lever 45 is first put at position L and, after the engine E has started in neutral, the operating force is gradually released by means of the clutch lever 64. The first clutch C1 is then connected via a half-clutch state and accordingly the stepless variable speed gear Ta starts to operate so that the transmission starts at the maximum gear ratio, causing the vehicle to start smoothly.

(Stepless transmission)

When the engine has been started, the hydraulic pump 54 also starts and the high pressure operating fluid discharged from the pump passes through the high pressure oil passage 56 and the first output oil passage 58 and the pilot valves 42, 43 of the first and second oil hydraulic servomotors S1, S2 are supplied with operating fluid. Accordingly, if the position of the transmission lever 45 is changed from L to H by turning the gear-shift grip 48 after the vehicle is started, the pilot valves 42, 43 will move to the right in the drawing, the hydraulic servomotors S1, S2 will follow the movement and start to operate, causing the movable half-pulley 8b on the driving side to move forward (to the right in the drawing) and the movable half-pulley 9b on the driven side to move backward (to the right in the drawing). Thus the gear ratio of the stepless variable speed gear Ta is increased in a stepless manner, that is, the gear is shifted down.

(Overdrive)

For high speed cruising, the gear lever 45 is shifted from position H to OD. The control valve V moves to the position shown in FIG. 2A, causing the high pressure oil passage 56 to communicate with the second output oil passage 59 via the first annular groove 51 while cutting off the communication of the output oil passage 59 with the low pressure oil passage 57, so that high pressure operating fluid from the hydraulic pump 54 also flows into the second output oil passage 59 and then into the branch oil passages $59_1$, $59_2$, supplying the hydraulic cylinders 32, 40 of the first and second clutches C1, C2 with operating fluid, thus allowing each of the pistons to operate. As a result, the normally-closed first clutch C1 is disconnected because the piston 33 moves the pressure plate 27 against the spring force of the clutch spring 29. On the other hand, the normally-open second clutch C2 is connected because the piston 38 presses the clutch plates 36, 37 together against the spring force of the return spring 41. In this case, the ratio of distribution of the operating fluid to the two oil hydraulic cylinders 32, 40 is defined by the distribution orifices $60_1$, $60_2$ of the oil passages $59_1$, $59_2$ and this makes it possible to obtain the appropriate timing of the disconnection of the first clutch C1 and the connection of the second clutch C2. Thus the operation of the stepless variable speed gear Ta is stopped, and the interlocking transmission gear Tb is operated instead, and thereby overdrive is established.

(Deceleration from overdrive)

If the position of the gear lever 45 is shifted from OD to H, the control valve V will return to the position shown in FIG. 2, and the second output oil passage is made to communicate with the low pressure oil passage 57. For this reason, the operating fluid applying oil pressure to the hydraulic cylinders 32, 40 is discharged and sent to the oil tank 55 through the low pressure oil passage 57, and the first and second clutches C1, C2 resume their respective connected and disconnected states. The operation of the interlocking transmission gear is switched over to that of the stepless variable speed gear Tb. In this case, the speed at which the operating fluid is sent to the oil tank from the two hydraulic cylinders 32, 40 is controlled by the orifice 61 of the low pressure oil passage 57. Accordingly, the first clutch C1 can be connected automatically via a half-clutch state and shock to the transmission system accompanying the switching operation can be absorbed by means of the appropriate slipping action in the half-clutch state of the first clutch C1.

Figure 3:
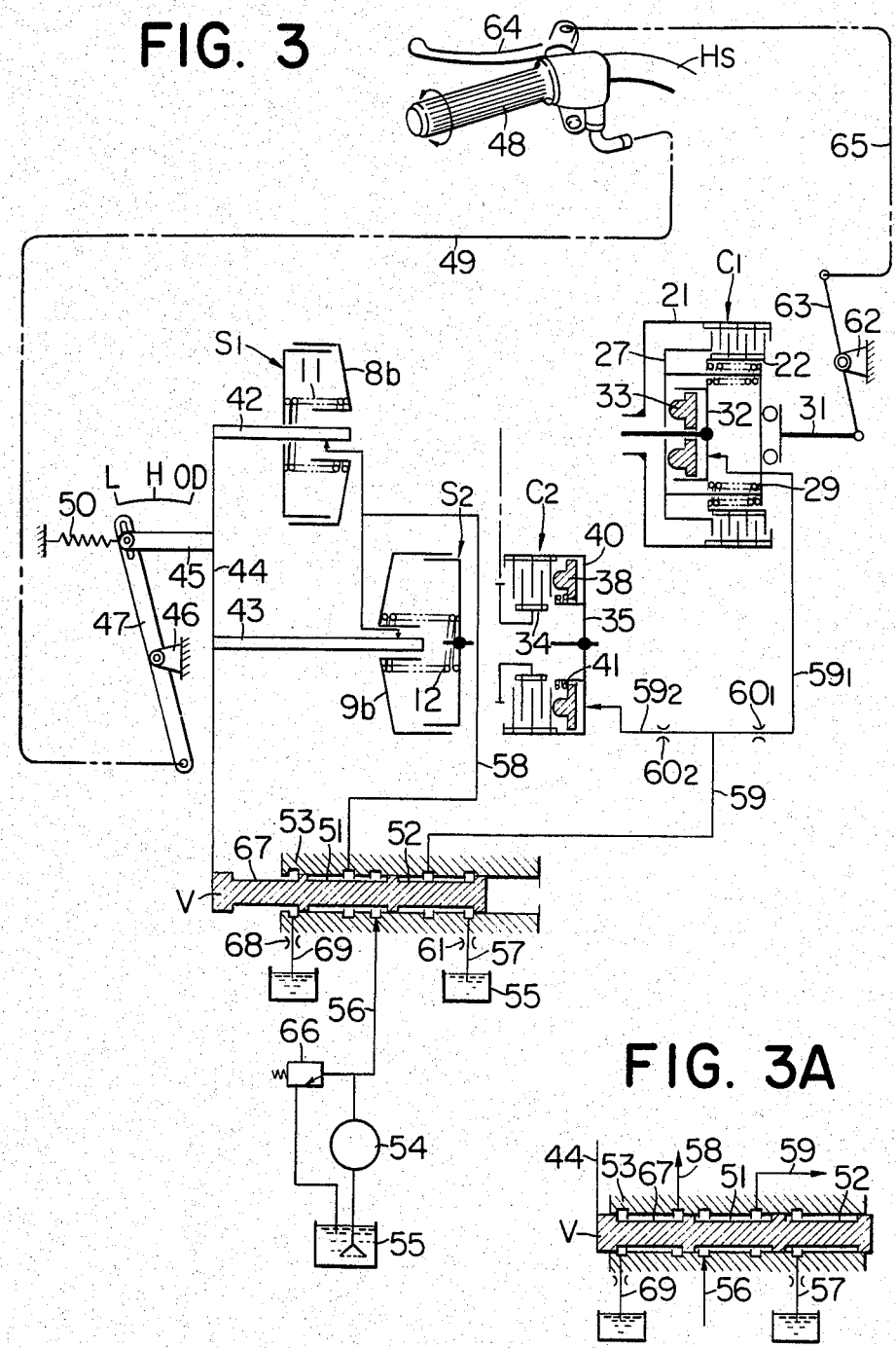
FIG. 3 is a diagram of the hydraulic control circuit of a second embodiment.

FIG. 3 illustrates a second embodiment of the present invention, wherein the control valve V is provided with a third annular groove 67, and a second low pressure oil passage 69 with an orifice 68 is provided for the valve case 53. When the position of the gear lever 45 is shifted to OD, the first output oil passage 58 is made to communicate with the second low pressure oil passage 69 via the third annular groove 67 as shown in FIG. 3A. With this arrangement, during overdrive when the operation of the V-velt stepless variable speed gear Ta is stopped, the operating fluid of the first and second oil hydraulic servomotors S1, S2 is discharged into the oil tank 55, allowing the stepless variable speed gear Ta to be released from the oil pressure. Therefore, no unnecessary compression loading is applied to the V-belt 10, and its life is effectively prolonged. Other details of the construction are similar to those in the first embodiment. In FIG. 3, like numerals refer to like parts.

Figure 4:
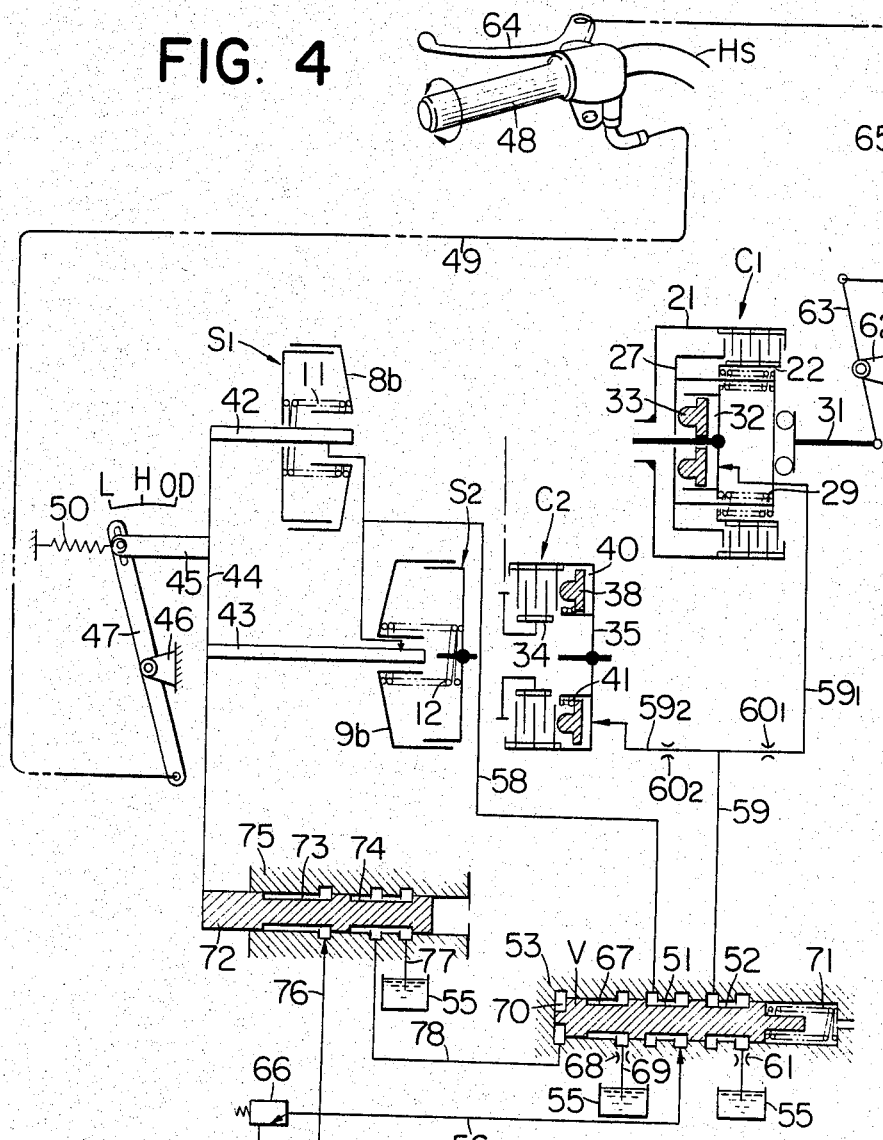
FIG. 4 is a diagram of the hydraulic control circuit of a third embodiment.

FIG. 4 illustrates a third embodiment of the present invention, wherein the control valve V is hydraulically operated. In other words, a pressure receiving chamber 70 facing the left-hand end surface of the control valve V is provided in the valve case 53, and a return spring 71 pressing against the right-hand end surface of the valve is also provided. A spool type of location-detecting valve 72 is connected to the interlocking rod 44; this valve is provided with first and second annular grooves 73, 74. A second high pressure oil passage 76, a third low pressure oil passage 77 and a signal-oil passage 78 are connected to the valve case 75 containing the valve 72, the other end of the this signal-oil passage 78 is connected to the pressure receiving chamber 70. Other details of its construction are the same as those of the embodiment of FIG. 3.

Figure 4A:
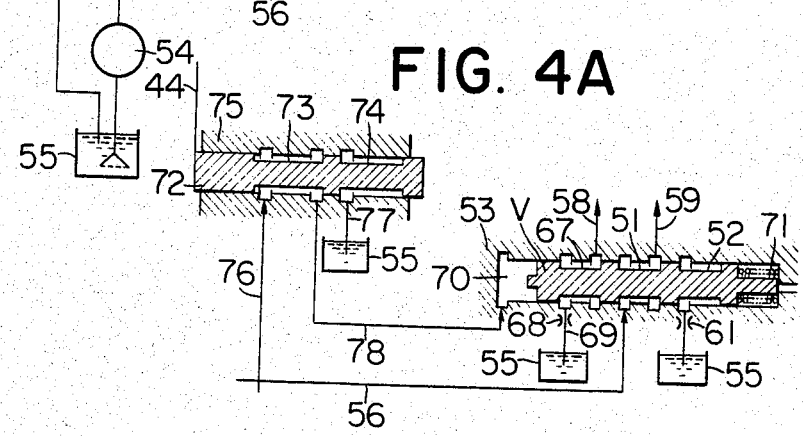
FIG. 4A is an operational diagram of the principal parts of FIG. 4.

When the gear lever 45 is being shifted between the positions L and H, the location-detecting valve 72 is in the state shown in FIG. 4 and the signal-oil passage 78 is made to communicate with the third low pressure oil passage 77 because the second high pressure oil passage 76 is closed. In so doing, because the pressure receiving chamber 70 is opened to the oil tank 55, the control valve V is held to the left by the force of the return spring 71, and the high pressure oil passage 57 communicates with the first output oil passage 58. Subsequently, if the position of the gear lever 45 is shifted to OD, the location-detecting valve 72 reaches its rightmost position as shown in FIG. 4A, and the high pressure oil passage 76 is made to communicate with the signal-oil passage 78. Consequently, the operating fluid discharged from the hydraulic pump 54 is supplied to the pressure receiving chamber 70, and the oil pressure makes the control valve V move to the right against the spring force of the return spring 71. Because of this rightward movement, the high pressure oil passage 56 is made to communicate with the second output oil passage, so that the overdrive state as shown in FIG. 3A is established.

According to the present invention, the V-belt stepless variable speed gear and the interlocking transmission gear are installed parallel to each other between the input and output shafts so that they can be selectively operated by switching the operation of the first and second clutches. Therefore, in driving conditions which are subject to variations of the load, for instance, starting, acceleration, deceleration, climbing, and the like, the V-belt stepless variable speed gear is operated to give a gear ratio between the input and output shafts appropriate to the driving conditions on a stepless basis, so that excellent drivability is provided. Moreover, when cruising, for instance, when the load hardly varies at all, the interlocking transmission gear is operated to obtain a high transmission efficiency, thus a reduction in fuel cost can be attained. Furthermore, when compared with conventional transmissions, the period during which the stepless variable speed gear is operating is reduced by the period during which the interlocking transmission gear is operating, so that the life of the V-belt can be prolonged.

Since a normally-closed hydraulically operated first clutch and a normally-open hydraulically operated second clutch are provided, it is possible to switch the operation of the two clutches by supplying operating fluid to the clutches and discharging the fluid therefrom by means of a common control valve and thus simplify the hydraulic circuit.

Furthermore, if the low pressure oil passage is provided with an orifice for discharging the operating fluid from both of the clutches, the speed of discharging the fluid from the clutches can be controlled so that a half-clutch state is automatically established during the time in which the first clutch is being connected, and the half-clutch state is utilized to effectively absorb the shock generated in the transmission system when the operation of the interlocking transmission gear is switched over to that of the V-belt stepless variable speed gear.

If a hydraulic servomotor is provided for conducting the speed-changing operation of the V-belt stepless variable speed gear, such an operation can be carried out neatly with a small input and, because the oil pressure may be released from the hydraulic servomotor when the V-belt stepless variable speed gear is not being operated, the V-belt of the gear is prevented from receiving any unnecessary compression load from the hydraulic servomotor, and thus the life of the V-belt can be further prolonged.

In addition, if the first clutch is connected and disconnected independently by means of a first operating apparatus, and if the first and second clutches are alternately connected and disconnected interlockingly by means of a second operating apparatus, the first operating apparatus may be used during starting in order to operate the first clutch as an ordinary starting clutch to make it possible to start the V-belt stepless variable speed gear, whereas during cruising the second operating apparatus is employed to isolate the first clutch and connect the second clutch at the same time in order to simplify the switching of the operation of the V-belt stepless variable speed gear over to that of the interlocking transmission gear. Accordingly, it becomes unnecessary to provide a specific starting clutch and, together with the decentralized arrangements of the input and output shafts of the first and second clutches, a transmission which is fairly simple in construction and compact in size can be obtained.

What is claimed is:

1. A transmission for a motor vehicle comprising an input shaft connected to a crank shaft of an engine of the motor vehicle; an output shaft connected to a driving wheel of the motor vehicle; a V-belt stepless variable speed gear interposed between said input and output shafts, said V-belt stepless variable speed gear being capable of providing different gear ratios of said input and output shaftes on a stepless basis during its operation; an interlocking transmission gear installed between said input and output shafts parallel to said stepless variable speed gear, said interlocking transmission gear being capable of providing a preset gear ratio of said input and output shafts during its operation; a hydraulically operated first clutch of a normally-closed type provided on said input shaft for operating said V-belt variable speed gear when said first clutch is connected; a hydraulically operated second clutch of a normally-open type provided on said output shaft for operating said interlocking transmission gear when said second clutch is connected; and a control valve causing the hydraulic cylinders of said first and second clutches to communicate alternately with an oil pump and an oil tank.

2. A transmission for a motor vehicle as claimed in claim 1, wherein a low pressure oil passage connecting said control valve to said oil tank is provided with a built-in orifice.

3. A transmission for a motor vehicle is claimed in claim 1 or 2, wherein said transmission is further provided with a hydraulic servomotor for conducting the speed-changing operation of said V-belt stepless variable speed gear, and valve means attached to an oil passage and adapted for supplying operating fluid to said hydraulic servomotor from said hydraulic pump and for opening said hydraulic servomotor to said oil tank in accordance with the operation of an actuating means.

4. A transmission for a motor vehicle as claimed in claim 1, wherein said transmission is further provided with an operating apparatus for causing said first clutch to connect and disconnect independently, and a second operating apparatus for causing said first and second clutches to connect and disconnect interlockingly and alternately.

5. A transmission for a motor vehicle as claimed in claim 4, wherein said first operating apparatus is so constructed that it is operated manually and mechanically, whereas said second operating apparatus is so constructed that it is operated automatically and hydraulically.

6. A transmission for a motor vehicle as claimed in claim 5, wherein said first clutch comprises a clutch outer driven by said crank shaft, a clutch inner connected to said input shaft and arranged within said clutch outer, a driving clutch plate connected to said clutch outer, a driven clutch plate connected to said clutch inner and superposed with said driving clutch plate, a pressure plate for applying pressure to said two clutch plates when moving forward in order to connect said clutch plates together frictionally, a clutch spring for energizing said pressure plate in the direction of its forward movement, a clutch lifter mechanically operated by said first operating apparatus and capable of moving said pressure plate backward, and a piston which is hydraulically operated by said second operating apparatus and is capable of moving said pressure plate backward.

* * * * *